United States Patent
Wang et al.

(10) Patent No.: US 11,350,375 B2
(45) Date of Patent: May 31, 2022

(54) METHOD AND APPARATUS FOR REPORTING POWER REDUCTION INFORMATION, TERMINAL DEVICE AND NETWORK DEVICE

(71) Applicant: GUANGDONG OPPO MOBILE TELECOMMUNICATIONS CORP., LTD., Guangdong (CN)

(72) Inventors: Shukun Wang, Guangdong (CN); Jinqiang Xing, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/361,276

(22) Filed: Jun. 28, 2021

(65) Prior Publication Data

US 2021/0329570 A1    Oct. 21, 2021

Related U.S. Application Data

(63) Continuation of application No. PCT/CN2020/082316, filed on Mar. 31, 2020.

(51) Int. Cl.
*H04W 52/36* (2009.01)
(52) U.S. Cl.
CPC .................. *H04W 52/365* (2013.01)
(58) Field of Classification Search
CPC ......... H04W 52/0216; H04W 52/0219; H04W 52/365
USPC .................. 455/522, 69, 452.1, 509, 515, 68
See application file for complete search history.

(56) References Cited

U.S. PATENT DOCUMENTS

| | | | | |
|---|---|---|---|---|
| 2015/0085760 A1* | 3/2015 | Yamada | ............... | H04W 52/365 370/329 |
| 2015/0189606 A1* | 7/2015 | Kim | .................... | H04W 52/146 455/522 |
| 2021/0297104 A1* | 9/2021 | Zhou | ..................... | H04W 24/10 |

FOREIGN PATENT DOCUMENTS

| | | |
|---|---|---|
| CN | 102123437 A | 7/2011 |
| CN | 102300249 A | 12/2011 |
| EP | 2696633 A1 | 2/2014 |

OTHER PUBLICATIONS

3GPP TS 38.321 V16.2.1 (Sep. 2020)—3rd Generation Partnership Project; Technical Specification Group Radio Access Network; NR; Medium Access Control (MAC) protocol specification (Release 16) (154 pages).
3GPP TSG RAN WG1 Meeting #100-e-R1-2000245—e-Meeting, Feb. 24-Mar. 6, 2020—ZTE, Enhancement on FR2 MPE mitigation (3 pages).
3GPP TSG-RAN WG4 Meeting #94-e-R4-2000495—E-meeting, Feb. 24-Mar. 6, 2020—ZTE, Enhancement on FR2 MPE mitigation (3 pages).
International Search Report dated Dec. 30, 2020 of PCT/CN2020/082316 (6 pages).

(Continued)

*Primary Examiner* — John J Lee
(74) *Attorney, Agent, or Firm* — Perkins Coie LLP

(57) ABSTRACT

Implementations of the present disclosure provide a method and apparatus for reporting power reduction information, a terminal device and a network device. The method includes: a terminal device sending a first media access control control element (MAC CE) to a network device, the first MAC CE including power management-maximum power reduction (P-MPR) information of at least one carrier.

22 Claims, 9 Drawing Sheets

(56) References Cited

OTHER PUBLICATIONS

Apple Inc. "Further considerations on the uplink duty cycle enhancements for the MPE scenario" R4-1913530; 3GPP RAN WG4 Meeting #93; Reno, USA; Nov. 18-22, 2019. 10 pages.
Extended European Search Report for European Application No. 20891417.6 dated Mar. 21, 2022. 7 pages.
Vivo "Discussion on FR2 MPE mitigation" R4-2000124; 3GPP TSG-RAN WG4 Meeting #94-e; Electronic Meeting; Feb. 24-Mar. 6, 2020. 6 pages.

* cited by examiner

| C$_7$ | C$_6$ | C$_5$ | C$_4$ | C$_3$ | C$_2$ | C$_1$ | R |
|---|---|---|---|---|---|---|---|
| P | V | \multicolumn{6}{c}{PH (Type 2, SpCell of other MAC entity)} |
| R | R | \multicolumn{6}{c}{P$_{CMAX,f,c}$ 1} |
| P | V | \multicolumn{6}{c}{PH (Type 1, PCell)} |
| R | R | \multicolumn{6}{c}{P$_{CMAX,f,c}$ 2} |
| P | V | \multicolumn{6}{c}{PH (Type X, Serving cell 1)} |
| R | R | \multicolumn{6}{c}{P$_{CMAX,f,c}$ 3} |

...

| P | V | PH (Type X, Serving cell n) |
|---|---|---|
| R | R | P$_{CMAX,f,c}$ m |

FIG. 2B

A terminal device sends a first MAC CE to a network device, the first MAC CE includes P-MPR information of at least one carrier — 301

FIG. 3

| 7 | 6 | 5 | 4 | 3 | 2 | 1 | 0 |
|---|---|---|---|---|---|---|---|
| P=0 | V=0 | \multicolumn{6}{c}{PHR} |||||| 
| R | R | \multicolumn{6}{c}{$P_{CMAX,f,c}$} ||||||

FIG. 4A

| 7 | 6 | 5 | 4 | 3 | 2 | 1 | 0 |
|---|---|---|---|---|---|---|---|
| P=0 | V=1 | \multicolumn{6}{c}{PHR} ||||||

FIG. 4B

| 7 | 6 | 5 | 4 | 3 | 2 | 1 | 0 |
|---|---|---|---|---|---|---|---|
| P=1 | V=0 | \multicolumn{6}{c}{PHR} ||||||
| P-MPR reporting index | | \multicolumn{6}{c}{$P_{CMAX,f,c}$} ||||||

FIG. 4C

| 7 | 6 | 5 | 4 | 3 | 2 | 1 | 0 |
|---|---|---|---|---|---|---|---|
| P=1 | V=0 | \multicolumn{6}{c}{PHR} ||||||
| R | R | \multicolumn{6}{c}{$P_{CMAX,f,c}$} ||||||
| \multicolumn{8}{c}{P-MPR reporting index} ||||||||

FIG. 4D

|   7   |   6   |   5   |   4   |   3   |   2   |   1   |   0   |
|-------|-------|-------|-------|-------|-------|-------|-------|
| P=1 | V=1 | \multicolumn{6}{c}{PHR} |

| 7 | 6 | 5 | 4 | 3 | 2 | 1 | 0 |
|---|---|---|---|---|---|---|---|
| P=1 | V=1 | PHR | | | | | |
| | | P-MPR reporting index | | | | | |

(a)

| 7 | 6 | 5 | 4 | 3 | 2 | 1 | 0 |
|---|---|---|---|---|---|---|---|
| P=1 | V=1 | PHR | | | | | |
| R | R | P-MPR reporting index | | | | | |

| 7 | 6 | 5 | 4 | 3 | 2 | 1 | 0 |
|---|---|---|---|---|---|---|---|
| P=1 | V=1 | PHR | | | | | |
| P-MPR reporting index x | | P-MPR reporting index y | | | | | |

FIG. 4F

| 7 | 6 | 5 | 4 | 3 | 2 | 1 | 0 |
|---|---|---|---|---|---|---|---|
| P=1 | V=0 | \multicolumn{6}{c|}{PHR} |
| R | R | \multicolumn{6}{c|}{$P_{CMAX,f,c}$} |

FIG. 5A

| 7 | 6 | 5 | 4 | 3 | 2 | 1 | 0 |
|---|---|---|---|---|---|---|---|
| P=1 | V=0 | \multicolumn{6}{c|}{PHR} |
| \multicolumn{8}{|c|}{P-MPR reporting index} |

FIG. 5B

|   7   |   6   |  5  |  4  |  3  |  2  |  1  |  0  |
|-------|-------|-----|-----|-----|-----|-----|-----|
| P=1   | V=0   | \multicolumn{6}{c}{PHR}               |
| F=1   | R     | \multicolumn{6}{c}{$P_{CMAX,f,c}$}    |

(a)

|   7   |   6   |  5  |  4  |  3  |  2  |  1  |  0  |
|-------|-------|-----|-----|-----|-----|-----|-----|
| P=1   | V=0   | \multicolumn{6}{c}{PHR}                    |
| F=0   | R     | \multicolumn{6}{c}{P-MPR reporting index}  |

| Serving cell index | P-MPR reporting index |
|---|---|

FIG. 6A

| Serving cell index | P-MPR reporting index |
|---|---|
| P-MPR reporting index ||

FIG. 6B

METHOD AND APPARATUS FOR REPORTING POWER REDUCTION INFORMATION, TERMINAL DEVICE AND NETWORK DEVICE

CROSS-REFERENCE TO RELATED APPLICATION

The present application is a continuation application of International PCT Application No. PCT/CN2020/082316, filed on Mar. 31, 2020, the entire content of which is hereby incorporated by reference.

TECHNICAL FIELD

Implementations of the present disclosure relate to the technical field of mobile communication, and more particularly, to a method and apparatus for reporting power reduction information, a terminal device and a network device.

BACKGROUND

A terminal device reports a power headroom report (PHR) to assist the network side in uplink power control and uplink scheduling. Considering the coexistence of a human body and multiple systems, the concept of power management-maximum power reduction (P-MPR) is introduced. A value of the P-MPR is determined by the terminal device itself and is not restricted by the network side, so the network side does not know the value of the P-MPR. How the terminal device reports the P-MPR is a problem to be solved.

SUMMARY

Implementations of the present disclosure provide a method and apparatus for reporting power reduction information, a terminal device and a network device.

A method for reporting power reduction information is provided by an implementation of the present disclosure, including:
sending, by a terminal device, a first media access control control element (MAC CE) to a network device, the first MAC CE including P-MPR information of at least one carrier.

A method for reporting power reduction information is provided by an implementation of the present disclosure, including:
receiving, by a network device, a first MAC CE sent by a terminal device, the first MAC CE including at least one piece of P-MPR information.

An apparatus for reporting power reduction information is provided by an implementation of the present disclosure, applied to a terminal device, including:
a sending unit configured to send a first MAC CE to a network device, the first MAC CE including P-MPR information of at least one carrier.

An apparatus for reporting power reduction information is provided by an implementation of the present disclosure, applied to a network device, including:
a receiving unit configured to receive a first MAC CE sent by a terminal device, the first MAC CE including at least one piece of P-MPR information.

A terminal device is provided by an implementation of the present disclosure, including a processor and a memory. The memory is used for storing a computer program, and the processor is used for invoking and running the computer program stored in the memory to execute the method for reporting the power reduction information described above.

A network device is provided by an implementation of the present disclosure, including a processor and a memory. The memory is used for storing a computer program, and the processor is used for invoking and running the computer program stored in the memory to execute the method for reporting the power reduction information described above.

A chip is provided by an implementation of the present disclosure, used for implementing the methods for reporting the power reduction information described above.

Specifically, the chip includes a processor used for invoking and running a computer program from a memory to cause a device having the chip installed thereon to execute the methods for reporting the power reduction information described above.

A computer readable storage medium is provided by an implementation of the present disclosure, used for storing a computer program, which causes a computer to execute the methods for reporting the power reduction information described above.

A computer program product is provided by an implementation of the present disclosure, including computer program instructions, which cause a computer to execute the methods for reporting the power reduction information described above.

A computer program is provided by an implementation of the present disclosure, which, when running on a computer, causes the computer to execute the methods for reporting the power reduction information described above.

Through the above technical solution, a terminal device reports P-MPR information of at least one carrier to a network side by the first MAC CE (i.e., PHR MAC CE or independent MAC CE), thereby providing a P-MPR reporting mechanism, such that the network side can better understand a power reduction situation of the terminal device and better perform uplink power control and uplink scheduling for the terminal device.

BRIEF DESCRIPTION OF DRAWINGS

The drawings described herein are used to provide a further understanding of the present disclosure and form a portion of the present disclosure. Illustrative implementations of the present disclosure and the description thereof are used to explain the present disclosure, but do not constitute improper limitation to the present disclosure.

FIG. 2B is a format diagram of a PHR of multiple cells in accordance with an implementation of the present disclosure.

FIG. 3 is a flowchart of a method for reporting power reduction information in accordance with an implementation of the present disclosure.

FIG. 4A is a first schematic structure diagram of power headroom information in accordance with an implementation of the present disclosure.

FIG. 4B is a second schematic structure diagram of power headroom information in accordance with an implementation of the present disclosure.

FIG. 4C is a third schematic structure diagram of power headroom information in accordance with an implementation of the present disclosure.

FIG. 4D is a fourth schematic structure diagram of power headroom information in accordance with an implementation of the present disclosure.

FIG. 4E is a fifth schematic structure diagram of power headroom information in accordance with an implementation of the present disclosure.

FIG. 4F is a sixth schematic structure diagram of power headroom information in accordance with an implementation of the present disclosure.

FIG. 5A is a seventh schematic structure diagram of power headroom information in accordance with an implementation of the present disclosure.

FIG. 5B is an eighth schematic structure diagram of power headroom information in accordance with an implementation of the present disclosure.

FIG. 5C is a ninth schematic structure diagram of power headroom information in accordance with an implementation of the present disclosure.

FIG. 6A is a first schematic structure diagram of a first MAC CE in accordance with an implementation of the present disclosure.

FIG. 6B is a second schematic structure diagram of a first MAC CE in accordance with an implementation of the present disclosure.

DETAILED DESCRIPTION

Technical solutions of implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions of the implementations of the present disclosure may be applied to various communication systems, such as a Long Term Evolution (LTE) system, an LTE Frequency Division Duplex (FDD) system, a LTE Time Division Duplex (TDD) system, a system, a 5G system or a future communication system.

Figures 1, 2A:
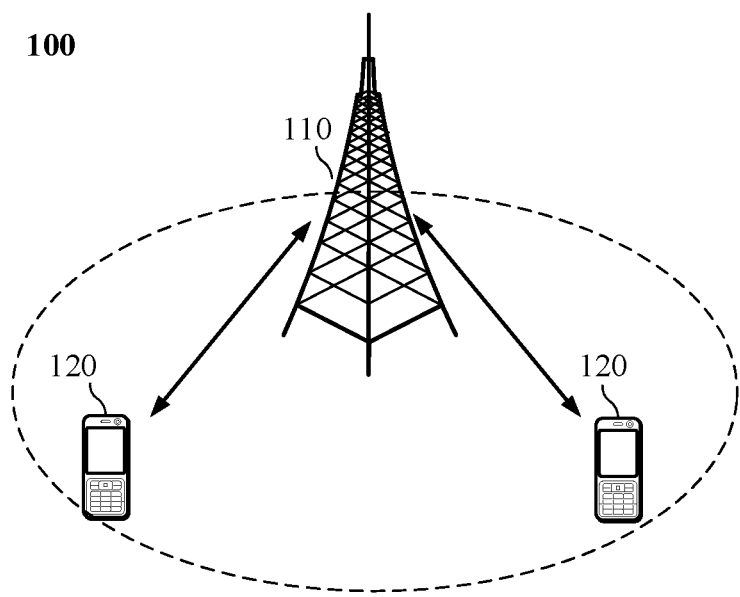
FIG. 1 is a schematic diagram of a communication system architecture in accordance with an implementation of the present disclosure.
FIG. 2A is a format diagram of a PHR of a single cell in accordance with an implementation of the present disclosure.

Illustratively, a communication system 100 applied in an implementation of the present disclosure is shown in FIG. 1. The communication system 100 may include a network device 110, which may be a device that communicates with a terminal 120 (or referred to as communication terminal, or terminal). The network device 110 may provide communication coverage for a specific geographical area, and may communicate with a terminal located within the coverage area. Optionally, the network device 110 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future communication system.

The communication system 100 further includes at least one terminal 120 located within the coverage area of the network device 110. The "terminal" as used herein includes, but is not limited to, an apparatus configured to receive/send communication signals via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a handheld digital video broadcasting-handheld (DVB-H) network, a satellite network, and an amplitude modulation-frequency modulation (AM-FM) broadcast transmitter; and/or another terminal; and/or an Internet of Things (IoT) device. A terminal configured to communicate via a wireless interface may be referred to as "a wireless communication terminal", "a wireless terminal" or "a mobile terminal". An example of the mobile terminal includes, but is not limited to, a satellite or cellular phone; a personal communication system (PCS) terminal capable of combining a cellular radio phone with data processing, facsimile, and data communication abilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic devices including a radio phone transceiver. The terminal may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal in a 5G network, or a terminal in a future evolved Public Land Mobile Network (PLMN).

Optionally, device to device (D2D) communication may be established between the terminals 120.

Optionally, the 5G system or 5G network may also be referred to as a new radio (NR) system or a NR network FIG. 1 shows one network device and two terminals illustratively. Optionally, the communication system 100 may include multiple network devices, and other numbers of terminals may be included within the coverage area of each network device, which is not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, such as other network entities, such as network controllers and mobile management entities, which is not limited in the implementations of the present disclosure.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is an "or" relationship between the associated objects before and after "/".

In order to facilitate understanding of the technical solutions of the implementations of the present disclosure, the technical solutions related to the implementations of the present disclosure will be explained below.

With people's pursuit of speed, latency, high-speed mobility, energy efficiency, and diversity and complexity of services in the future life, the $3^{rd}$ Generation Partnership Project (3GPP) International Standardization Organization began the research and development of 5G. Main application scenarios of 5G are: Enhance Mobile Broadband (eMBB), Ultra-Reliable and Low-Latency Communication (URLLC), Mass Machine-Type of Communication (mMTC).

On one hand, the eMBB aims at enabling users to obtain multimedia contents, services and data, and the demands for the eMBB are growing rapidly. On the other hand, because the eMBB may be deployed in different scenarios, such as indoors, urban districts, rural areas, and differences in its capabilities and demands are big, it cannot be generalized and must be analyzed in detail in combination with specific deployment scenarios. Typical applications of the URLLC include: industrial automation, power automation, telemedicine operation (surgery), traffic safety guarantee, etc. Typical characteristics of the mMTC include: high connection density, small data volume, latency-insensitive service, low cost and long service life of modules, etc.

In the early deployment of NR, complete NR coverage is difficult to obtain, so typical network coverage is wide-area LTE coverage and isolated island coverage mode of NR. Moreover, a large amount of LTE is deployed below 6 GHz, and there are few spectrums below 6 GHz which may be used for 5G. Therefore, spectrum applications above 6 GHz must be studied for NR, however, coverage in high frequent bands is limited and signals fade fast. Meanwhile, a working mode of tight interworking between LTE and NR is proposed in order to protect front-end investments of mobile operators in LTE.

In order to implement the deployment and commercial application of 5G networks as soon as possible, the 3GPP first completed the first 5G version, namely, LTE-NR Dual Connectivity (EN-DC). In the EN-DC, an LTE base station (eNB) serves as a master node (MN), and an NR base station (gNB or en-gNB) serves as a secondary node (SN), which is connected to an EPC core network. In the later stage of R15, other DC modes, i.e., NE-DC, 5GC-EN-DC and NR DC, will be supported. In the NE-DC, an NR base station serves as an MN, and an eLTE base station serves as an SN and is connected to a 5GC core network. In the 5GC-EN-DC, an eLTE base station serves as an MN, and an NR base station serves as an SN and is connected to a 5GC core network. In the NR DC, an NR base station serves as an MN, and an NR base station serves as an SN and is connected to a 5GC core network.

The technical solutions of the implementations of the present disclosure can be applied not only to a dual connectivity architecture (such as an MR-DC architecture), but also to a multiple connectivity (MC) architecture. Typically, the MC architecture may be an MR-MC architecture.

RRC State

In order to reduce air interface signaling, restore wireless connection quickly, and restore data services quickly, a new radio resource control (RRC) state, i.e., RRC_INACTIVE state, is defined for 5G. This state is different from an RRC_IDLE state and an RRC_ACTIVE state.

1) In the RRC_IDLE state (referred to as an idle state for short): mobility is UE-based cell selection and reselection, paging is initiated by a core network (CN), and a paging area is configured by the CN. There is neither UE context nor RRC connection at the base station side.

2) In an RRC_CONNECTED state (referred to as a connected state for short): an RRC connection exists, and UE contexts exist at the base station side and the UE side. The network side knows that the position of the UE is at a specific cell level. Mobility is controlled by the network side. Unicast data may be transmitted between the UE and the base station.

3) In the RRC_INACTIVE state (referred to as an inactive state for short): mobility is UE-based cell selection and reselection, there is a connection between a CN and an NR, there is a UE context on a certain base station, paging is triggered by a radio access network (RAN), a RAN-based paging area is managed by the RAN, and the network side knows that the position of the UE is at a RAN-based paging area level.

Power Headroom Report (PHR)

A terminal device reports a PHR to a network side, so as to assist the network side in better uplink data scheduling and uplink power control. The types of PHR include: type1 PHR, type2 PHR and type3 PHR.

type1 PHR (dB)=PCMAX−PUSCH transmit power;

type2 PHR (dB)=PCMAX−(PUSCH transmit power and PUCCH transmit power);

type3 PHR (dB)=PCMAX−SRS transmit power, where PCMAX refers to the maximum transmit power of the terminal device (or the maximum transmit power supported by the terminal device).

It should be noted that the PHR can be calculated, as described above, based on actual transmission or reference virtual transmission. Specifically, the PHR being calculated based on the actual transmission means that the PHR is calculated according to actually transmitted PUSCH, or PUSCH and PUCCH, or SRS. The PHR being calculated based on the reference virtual transmission means that the PHR is calculated according to a reference format. It should be noted that reference formats of different types of PHR are different.

In a single cell scenario (i.e., a scenario where neither dual connectivity nor uplink carrier aggregation is configured), the terminal device reports a PHR of a single cell, as shown in FIG. 2A.

In an MR-DC scenario, the terminal device will report PHRs of all active cells of the terminal device, including active cells at the MCG side and active cells at the SCG side, of the terminal device. For example, FIG. 2B shows a format of a PHR reported to a NR base station. $C_i$ ($1 \leq i \leq 7$) corresponds to an index of one serving cell, and $C_1$ to $C_7$ correspond to indexes of seven serving cells respectively. A value of Ci is used to indicate whether a PHR of the corresponding serving cell is reported. The PHR of each serving cell (or carrier) consists of 2 bytes, including the following information fields: a P field, a V field, a PHR field and a PCMAX field, where information in the P field is used to indicate whether P-MPR is applied. Information in the V field is used to indicate whether the PHR is calculated based on actual transmission or a reference format. Information in the PHR field is a PHR (also referred to as PH for short), where the type of the PHR may be type1 PHR, type2 PHR or type3 PHR, but are not limited thereto, and the type of the PHR may also be enhanced, such as typex PHR. Information in the PCMAX field is $P_{CMAX,f,c}$. The PCMAX field is optional. In the case that the information in the V field indicates that the PHR is calculated based on the actual transmission, $P_{CMAX,f,c}$ needs to be carried, and in the case that the information in the V field indicates that the PHR is calculated based on the reference format, $P_{CMAX,f,c}$ does not need to be carried (i.e., $P_{CMAX,f,c}$ is omitted and is not transmitted).

Considering the coexistence of a human body and multiple systems, the concept of P-MPR is introduced. A value of the P-MPR is determined by the terminal device itself and is not restricted by the network side, so the network side does not know the value of the P-MPR. Due to the introduction of the P-MPR, the P field is considered in the power headroom report, and the information in the P field is used to indicate whether the P-MPR is applied. In NR, considering FR2 radiation to the human body and the like, the value of the P-MPR may be very large, so the network side demands the terminal device to report the value of the P-MPR, that is, how much power is reduced by the terminal device specifically. Therefore, the following technical solution of an implementation of the present disclosure is proposed. In the technical solution of an implementation of the present disclosure, the P-MPR reporting can be applied to service cells of FR2, but are not limited thereto, and the P-MPR reporting can also be applied to service cells in other frequency band ranges.

FIG. 3 is a schematic flowchart of a method for reporting power reduction information in accordance with an implementation of the present disclosure. As shown in FIG. 3, the method for reporting the power reduction information includes the following act 301.

In act 301, a terminal device sends a first MAC CE to a network device, the first MAC CE including P-MPR information of at least one carrier.

In an implementation of the present disclosure, the terminal device sends the first MAC CE to the network device, and accordingly, the network device receives the first MAC CE sent by the terminal device. Here, the network device may be a base station, such as a gNB.

In an implementation of the present disclosure, the first MAC CE may be a PHR MAC CE or an independent MAC CE (or referred to as a PHR-specific MAC CE). The specific implementation of the first MAC CE will be described below.

The First MAC CE is a PHR MAC CE.

Here, the terminal device reports P-MPR information of one or more carriers through the existing PHR MAC CE. Here, the P-MPR information is specifically P-MPR reporting index information, where the P-MPR reporting index information is used to determine a value range of the P-MPR reporting (referred to as value information of P-MPR for short).

The PHR MAC CE includes power information of the one or more carriers, wherein the power information includes:
first information used to indicate whether the P-MPR is applied to the terminal device;
second information used to indicate whether a power headroom report (PHR) is calculated based on actual transmission or a reference format; and
third information which is a PHR.

For example, for the power information of each of the carriers, the power information includes a P field, a V field, a PHR field, and optionally a PCMAX field, where information in the P field (i.e., the first information) is used to indicate whether the P-MPR is applied, for example, P=1 indicates that the P-MPR is applied (at this time, power reduction information needs to be reported), and P=0 indicates that the P-MPR is not applied (at this time, the power reduction information does not need to be reported). Information in the V field (i.e., the second information) is used to indicate whether the PHR is calculated based on actual transmission or a reference format. For example, V=1 indicates that the PHR is calculated based on the reference format, and $P_{CMAX,f,c}$ does not need to be carried at this time (i.e., $P_{CMAX,f,c}$ is omitted and is not transmitted), and V=0 indicates that the PHR is calculated based on the actual transmission, and $P_{CMAX,f,c}$ needs to be carried in the PCMAX field at this time. Information in the PHR field (i.e., the third information) is a PHR (which can also be referred to as PH for short), where the type of the PHR may be type1 PHR, type2 PHR or type3 PHR, but is not limited thereto, and the type of the PHR can also be enhanced, such as typex PHR.

It should be noted that the description for "carrier" in an implementation of the present disclosure can also be replaced by "serving cell" or "cell".

It should be noted that the description for "first type of power headroom" in an implementation of the present disclosure can also be replaced by "type1 PHR", where "type1 PHR" can also be referred to as "type1 PH" for short.

It should be noted that the description for "second type of power headroom" in an implementation of the present disclosure can also be replaced by "type2 PHR", where "type2 PHR" can also be referred to as "type2 PH" for short.

It should be noted that the description for "third type of power headroom" in an implementation of the present disclosure can also be replaced by "type3 PHR", where "type3 PHR" can also be referred to as "type3 PH" for short.

The specific implementation of the power information will be described according to the following cases in combination with different indication manners for the first information and the second information.

A) In the case that the first information indicates that the P-MPR is not applied to the terminal device, if the second information indicates that the PHR is calculated based on the actual transmission, the power information includes fourth information in addition to the first information, the second information and the third information, wherein the fourth information is used to indicate the maximum transmit power of the terminal device.

Here, the first information is P indication information, the second information is V indication information, the third information is PHR, and the fourth information is $P_{CMAX,f,c}$.

For example, referring to FIG. 4A, in the case of P=0 (that is, the P-MPR is not applied to the terminal device) and V=0 (that is, the PHR is calculated based on the actual transmission and $P_{CMAX,f,c}$ needs to be reported), power headroom information of one carrier includes P indication information, V indication information, PHR and $P_{CMAX,f,c}$.

B) In the case that the first information indicates that the P-MPR is not applied to the terminal device, if the second information indicates that the PHR is calculated based on the reference format, the power information includes only the first information, the second information and the third information.

Here, the first information is P indication information, the second information is V indication information, and the third information is PHR.

For example, referring to FIG. 4B, in the case of P=0 (that is, the P-MPR is not applied to the terminal device) and V=1 (that is, the PHR is calculated based on the reference format, and $P_{CMAX,f,c}$ does not need to be reported), power headroom information of one carrier includes P indication information, V indication information and PHR.

C) In the case that the first information indicates that the P-MPR is applied to the terminal device, if the second information indicates that the PHR is calculated based on the actual transmission, the power information includes fourth information and fifth information in addition to the first information, the second information and the third information, wherein the fourth information is used to indicate the maximum transmit power of the terminal device; and the fifth information is used to indicate the value range of the P-MPR reporting.

Here, the first information is P indication information, the second information is V indication information, the third information is PHR, the fourth information is $P_{CMAX,f,c}$, and the fifth information is P-MPR reporting index, wherein the P-MPR reporting index is used to determine the value range of the P-MPR reporting.

In an optional implementation mode, the fourth information occupies 6 bits of a first byte, and the fifth information occupies 2 bits of the first byte.

For example, referring to FIG. 4C, in the case of P=1 (that is, the P-MPR is applied to the terminal device) and V=0 (that is, the PHR is calculated based on the actual transmission, and $P_{CMAX,f,c}$ needs to be reported), power headroom information of one carrier includes P indication information, V indication information, PHR, $P_{CMAX,f,c}$ and P-MPR reporting index. $P_{CMAX,f,c}$ occupies 6 bits of one byte, and the P-MPR reporting index occupies the remaining 2 bits of the byte.

In another optional implementation mode the fourth information occupies 6 bits of the first byte, and the fifth information occupies N1 bits of a second byte, wherein N1 is an integer greater than or equal to 2 and less than or equal to 8.

For example, referring to FIG. 4D, in the case of P=1 (that is, the P-MPR is applied to the terminal device) and V=0 (that is, the PHR is calculated based on the actual transmission, and $P_{CMAX,f,c}$ needs to be reported), power headroom information of one carrier includes P indication information, V indication information, PHR, $P_{CMAX,f,c}$ and P-MPR reporting index. $P_{CMAX,f,c}$ occupies 6 bits of one byte, and the P-MPR reporting index occupies 8 bits of another byte. It should be noted that in this case there is no effect on the byte occupied by the existing $P_{CMAX,f,c}$, and extra new bytes are added to report the P-MPR reporting index, wherein the number of bits that can be occupied by the P-MPR reporting index is not limited (8 bits are taken as an example in FIG. 4D).

It should be noted that the greater the number of bits occupied by the P-MPR reporting index is, the smaller the fine granularity of the value range of the P-MPR reporting indicated by the P-MPR reporting index is. On the contrary, the smaller the number of bits occupied by the P-MPR reporting index is, the greater the fine granularity of the value range of the P-MPR reporting indicated by the P-MPR reporting index is.

D1) In the case that the first information indicates that the P-MPR is applied to the terminal device, if the second information indicates that the PHR is calculated based on the reference format, the power information includes fifth information in addition to the first information, the second information and the third information, wherein the fifth information is used to indicate the value range of the P-MPR reporting.

Here, the first information is P indication information, the second information is V indication information, the third information is PHR, and the fifth information is P-MPR reporting index, wherein the P-MPR reporting index is used to determine the value range of the P-MPR reporting.

In an optional implementation mode, the fifth information occupies N2 bits of the first byte, and N2 is an integer greater than or equal to 2 and less than or equal to 8.

For example, referring to FIG. 4E, in the case of P=1 (that is, the P-MPR is applied to the terminal device) and V=1 (that is, the PHR is calculated based on the reference format, and $P_{CMAX,f,c}$ does not need to be reported), power headroom information of one carrier includes P indication information, V indication information, PHR and P-MPR reporting index. In (a) of FIG. 4E, the P-MPR reporting index occupies 8 bits of one byte, and in (b) of FIG. 4E, the P-MPR reporting index occupies 6 bits of one byte. It should be noted that the number of bits that may be occupied by the P-MPR reporting index is not limited.

It should be noted that the greater the number of bits occupied by the P-MPR reporting index is, the smaller the fine granularity of the value range of P-MPR reporting indicated by the P-MPR reporting index is. On the contrary, the smaller the number of bits occupied by the P-MPR reporting index is, the greater the fine granularity of the value range of the P-MPR reporting indicated by the P-MPR reporting index is.

D2) In the case that the first information indicates that the P-MPR is applied to the terminal device, if the second information indicates that the PHR is calculated based on the reference format, the power information includes fifth information in addition to the first information, the second information and the third information, and the fifth information includes first sub-information and second sub-information, wherein the first sub-information is used to indicate a first value range of the P-MPR and the second sub-information is used to indicate a second value range of the P-MPR within the first value range.

Here, the first information is P indication information, the second information is V indication information, the third information is PHR, the first sub-information is P-MPR reporting index x, and the second sub-information is P-MPR reporting index y, wherein the P-MPR reporting index x is used to determine the first value range (i.e., large granularity range) of the P-MPR reporting, and the P-MPR reporting index y is used to determine the second value range (i.e., small granularity range) of the P-MPR reporting within the first value range.

In an optional implementation mode, the first sub-information occupies N3 bits of the first byte, and the second sub-information occupies N4 bits of the first byte, both N3 and N4 being integers greater than or equal to 2, and the sum of N3 and N4 being less than or equal to 8.

For example, referring to FIG. 4F, in the case of P=1 (that is, the P-MPR is applied to the terminal device) and V=1 (that is, the PHR is calculated based on the reference format, and $P_{CMAX,f,c}$ does not need to be reported), power headroom information of one carrier includes P indication information, V indication information, PHR, P-MPR reporting index x and p-MPR reporting index y. The P-MPR reporting index x occupies 2 bits of one byte, and the P-MPR reporting index y occupies the remaining 6 bits of the byte. It should be noted that the number of bits that may be occupied by the P-MPR reporting index x and P-MPR reporting index y is not limited. The P-MPR reporting index x indicates a power reduction value in the large granularity range, while the P-MPR reporting index y indicates a power reduction value in a further fine granularity range in the large granularity range indicated by the P-MPR reporting index x.

A corresponding relationship between the P-MPR reporting index and the P-MPR reporting range (referred to as power reduction range for short) is given below. As shown in table 1, taking the P-MPR reporting index occupying 2 bits as an example, its supported values may be 0, 1, 2, 3, and P-MPR reporting ranges correspond to different P-MPR reporting indexes are different.

TABLE 1

| P-MPR reporting index | P-MPR reporting range (dB) |
|---|---|
| 0 | 1~3 |
| 1 | 4~6 |
| 2 | 7~9 |
| 3 | >=10 |

In an implementation of the present disclosure, in order to ensure that overhead of the first MAC CE remains unchanged, the power information includes one of fourth information and fifth information in addition to the first information, the second information and the third information, wherein the fourth information is used to indicate the maximum transmit power of the terminal device, and the fifth information is used to indicate the value range of the P-MPR reporting.

Here, the first information is P indication information, the second information is V indication information, the third information is PHR, the fourth information is $P_{CMAX,f,c}$, and the fifth information is P-MPR reporting index, wherein the P-MPR reporting index is used to determine the value range of the P-MPR reporting. In this case, the terminal device will not report $P_{CMAX,f,c}$ and the P-MPR reporting index simultaneously.

In an optional implementation mode, the terminal device receives first indication information sent by the network device, the first indication information being used to indicate whether the terminal device reports the fourth information or the fifth information. Particularly, the first indication information is used to indicate whether the terminal device reports the fourth information or the fifth information in the case that the second information indicates that the PHR is calculated based on the actual transmission (i.e., for a case of V=0).

E1) If the first indication information indicates that the terminal device reports the fourth information, the PHR MAC CE includes the fourth information.

For example, referring to FIG. 5A, in the case of P=1 (that is, the P-MPR is applied to the terminal device) and V=0 (that is, the PHR is calculated based on the actual transmission, and $P_{CMAX,f,c}$ need to be reported), the network side instructs the terminal device to report $P_{CMAX,f,c}$, and power headroom information of one carrier includes P indication information, V indication information, PHR and $P_{CMAX,f,c}$. $P_{CMAX,f,c}$ occupies 6 bits of one byte.

E2) If the first indication information indicates that the terminal device reports the fifth information, the PHR MAC CE includes the fifth information.

For example, referring to FIG. 5B, in the case of P=1 (that is, the P-MPR is applied to the terminal device) and V=0 (that is, the PHR is calculated based on the actual transmission, and $P_{CMAX,f,c}$ needs to be reported), the network side instructs the terminal device to report a P-MPR reporting index, and power headroom information of one carrier includes P indication information, V indication information, PHR and P-MPR reporting index. The P-MPR reporting index occupies 8 bits of one byte. It should be noted that the number of bits occupied by the P-MPR reporting index is not limited (8 bits are taken as an example in FIG. 5B).

In the case E1) or E2) or the case that the first indication information is not sent by the network side, if the power information reported by the terminal device only includes one of the fourth information and the fifth information, then optionally, the power information also includes sixth information used for indicating whether the power information carries the fourth information or the fifth information.

For example, in the case that $P_{CMAX,f,c}$ and the P-MPR reporting index are not reported at the same time, the terminal device can dynamically indicate in the reported power information whether the power information contains $P_{CMAX,f,c}$ or the P-MPR reporting index. Referring to FIG. 5C, the sixth information is a flag (F), through which the terminal device indicates whether the currently reported power information carries $P_{CMAX,f,c}$ or the P-MPR reporting index. As shown in (a) of FIG. 5C, flag=1 indicates that $P_{CMAX,f,c}$ is carried in the power information, and as shown in (b) of FIG. 5C, flag=0 indicates that the P-MPR reporting index is carried in the power information. Of course, alternatively, flag=0 indicates that $P_{CMAX,f,c}$ is carried in the power information, and flag=1 indicates that the P-MPR reporting index is carried in the power information.

It should be noted that the number of bits occupied by the flag and the P-MPR reporting index in FIG. 5C is not limited to 1 or 6. The number of bits occupied by the flag and the P-MPR reporting index may be preset by the protocol or configured by the network.

The first MAC CE is an independent MAC CE (or referred to as a PHR-specific MAC CE).

Here, the terminal device reports the P-MPR information of one or more carriers through the newly defined MAC CE. Here, the P-MPR information is specifically P-MPR reporting index information, wherein the P-MPR reporting index information is used to determine the value range of the P-MPR reporting.

There may be the two following implementation modes in which the P-MPR information of one or more carriers is reported by the first MAC CE:

I) The first MAC CE includes seventh information and fifth information of one carrier, wherein the seventh information is a serving cell index; and the fifth information is used to indicate the value range of the P-MPR reporting.

Here, the seventh information is a serving cell index, and the fifth information is a P-MPR reporting index, wherein the P-MPR reporting index is used to determine the value range of the P-MPR reporting.

Here, the first MAC CE contains only the P-MPR reporting index of one carrier (or serving cell). Referring to FIG. 6A, the serving cell index and the P-MPR reporting index of one carrier are carried by one byte. Referring to FIG. 6B, the serving cell index of one carrier is carried by one byte, and the P-MPR reporting index of this carrier is carried by this byte and another byte. It should be noted that the number of bits occupied by the P-MPR reporting index is not limited (in FIG. 6A, as an example, partial bits of one byte are occupied; and in FIG. 6B, as an example, partial bits of one byte and all bits of another byte are occupied).

The number of bits occupied by the P-MPR reporting index may be preset by the protocol or configured by the network. The serving cell index may be a serving cell index configured by the network side, and further, it may be a serving cell index on FR2 configured by the network side (serving cell indexes are sorted in order from small to large) or an activated serving cell index on FR2 (serving cell indexes are sorted in order from small to large).

II) The first MAC CE includes a first bitmap and at least one piece of fifth information, wherein each bit in the first bitmap corresponds to one carrier, and a value of the bit is used to indicate whether the first MAC CE includes the fifth information of the carrier corresponding to the bit, and the fifth information is used to indicate the value range of the P-MPR reporting.

Here, header information of the first MAC CE carries the first bitmap, and the fifth information is P-MPR reporting index, wherein the P-MPR reporting index is used to determine the value range of the P-MPR reporting.

Figure 6C:
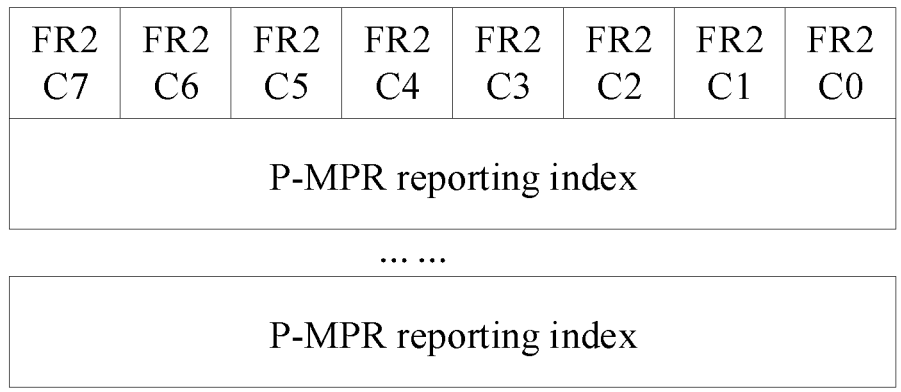
FIG. 6C is a third schematic structure diagram of a first MAC CE in accordance with an implementation of the present disclosure.

Here, the first MAC CE contains P-MPR reporting indexes of multiple carriers (or serving cells). Referring to FIG. 6C, the header of the first MAC CE includes the first bitmap, which corresponds to C0, C1, . . . , C7 one by one in order from small to large of all serving cell indexes on FR2 configured by the network side. The first bits may be fixed 8 bits or 32 bits, or may also be determined by rounding the number of carriers configured on FR2 or the number of carriers activated on FR2 with respect to 8-bits. Then, the P-MPR reporting index corresponding to each carrier is carried. It should be noted that the number of bits occupied by the P-MPR reporting index is not limited (in FIG. 6C, as an example, all bits of one byte are occupied).

In an implementation of the present disclosure, the triggering of the P-MPR reporting may mean that if the PHR reporting and/or the P-MPR reporting is triggered, then the P-MPR will be triggered for reporting. Specifically, the terminal device sends the first MAC CE to the network device in the case that the PHR reporting and/or the P-MPR reporting is triggered.

Here, a new trigger event is defined for the P-MPR reporting. Specifically, the P-MPR reporting being triggered includes at least one of:

determining that the P-MPR reporting is triggered based on a timer; and determining that the P-MPR reporting is triggered based on an event.

In an optional implementation mode, the event includes at least one of: a power reduction value being greater than or equal to a first threshold; and a power variation being greater than or equal to a second threshold. Further, optionally, values of the first threshold and the second threshold may be preset by the protocol or configured by the network.

According to the technical solution of an implementation of the present disclosure, a terminal device reports P-MPR information of at least one carrier to a network side through the first MAC CE (i.e., PHR MAC CE or independent MAC CE), thereby providing a P-MPR reporting mechanism, such that the network side can better understand power reduction of the terminal device and better perform uplink power control and uplink scheduling for the terminal device.

Figure 7:
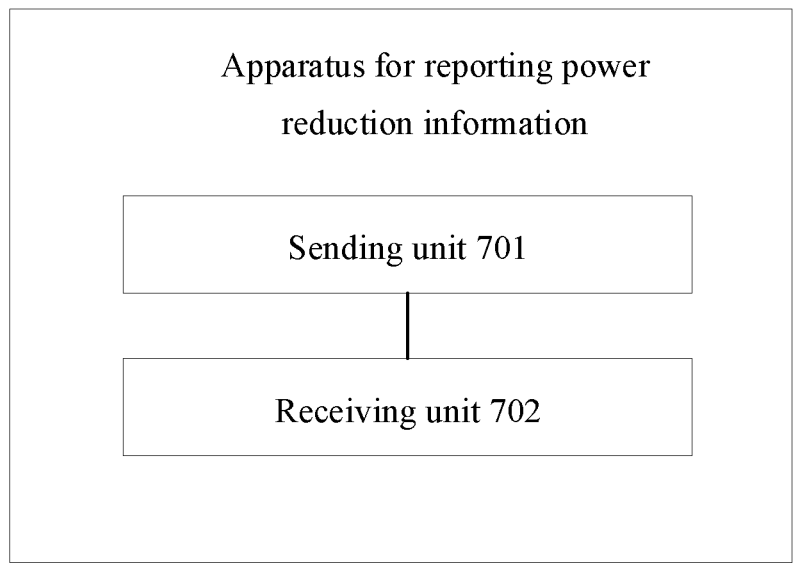
FIG. 7 is a first structure composition schematic diagram of an apparatus for reporting power reduction information in accordance with an implementation of the present disclosure.

FIG. 7 is a first structure composition schematic diagram of an apparatus for reporting power reduction information in accordance with an implementation of the present disclosure, which is applied to a terminal device and includes a sending unit 701.

The sending unit 701 is configured to send a first MAC CE to a network device, the first MAC CE includes P-MPR information of at least one carrier.

In an optional implementation mode, the first MAC CE is a PHR MAC CE, and the PHR MAC CE includes power information of one or more carriers, wherein the power information includes:

first information used to indicate whether the P-MPR is applied to the terminal device;

second information used to indicate whether a power headroom report (PHR) is calculated based on actual transmission or a reference format; and third information which is PHR.

In an optional implementation mode, in a case that the first information indicates that the P-MPR is applied to the terminal device, if the second information indicates that the PHR is calculated based on the actual transmission, the power information further includes fourth information and fifth information, wherein the fourth information is used to indicate the maximum transmit power of the terminal device; and the fifth information is used to indicate a value range of P-MPR reporting.

In an optional implementation mode, the fourth information occupies 6 bits of a first byte, and the fifth information occupies 2 bits of the first byte; or the fourth information occupies 6 bits of the first byte, and the fifth information occupies N1 bits of a second byte, N1 being an integer greater than or equal to 2 and less than or equal to 8.

In an optional implementation mode, in a case that the first information indicates that the P-MPR is applied to the terminal device, if the second information indicates that the PHR is calculated based on the reference format, the power information further includes fifth information, wherein the fifth information is used to indicate the value range of the P-MPR reporting.

In an optional implementation mode, the fifth information occupies N2 bits of the first byte, N2 being an integer greater than or equal to 2 and less than or equal to 8.

In an optional implementation mode, in a case that the first information indicates that the P-MPR is applied to the terminal device, if the second information indicates that the PHR is calculated based on the reference format, the power information further includes fifth information, which includes first sub-information and second sub-information, wherein the first sub-information is used to indicate a first value range of the P-MPR; and the second sub-information is used to indicate a second value range of the P-MPR within the first value range.

In an optional implementation mode, the first sub-information occupies N3 bits of the first byte, and the second sub-information occupies N4 bits of the first byte, both N3 and N4 being integers greater than or equal to 2, and the sum of N3 and N4 being less than or equal to 8.

In an optional implementation mode, the power information further includes one of fourth information and fifth information, wherein the fourth information is used to indicate the maximum transmit power of the terminal device, and the fifth information is used to indicate the value range of the P-MPR reporting.

In an optional implementation mode, the apparatus further includes a receiving unit 702. The receiving unit 702 is configured to receive first indication information sent by the network device, the first indication information being used to indicate whether the terminal device reports the fourth information or the fifth information.

In an optional implementation mode, if the first indication information indicates that the terminal device reports the fourth information, the PHR MAC CE includes the fourth information; or if the first indication information indicates that the terminal device reports the fifth information, the PHR MAC CE includes the fifth information.

In an optional implementation mode, the first indication information is used to indicate whether the terminal device reports the fourth information or the fifth information in a case that the second information indicates that the PHR is calculated based on the actual transmission.

In an optional implementation mode, the power information further includes sixth information, which is used to indicate whether the power information carries the fourth information or the fifth information.

In an optional implementation mode, the first MAC CE includes seventh information and fifth information of a carrier, wherein the seventh information is serving cell index; and the fifth information is used to indicate the value range of the P-MPR reporting.

In an optional implementation mode, the first MAC CE includes a first bitmap and at least one piece of fifth information, wherein each bit in the first bitmap corresponds to a carrier, and a value of the bit is used to indicate whether the first MAC CE includes the fifth information of the carrier corresponding to the bit, and the fifth information is used to indicate the value range of the P-MPR reporting.

In an optional implementation mode, the sending unit 701 is configured to send the first MAC CE to the network device in a case that the PHR reporting and/or the P-MPR reporting is triggered.

In an optional implementation mode, the P-MPR reporting being triggered includes at least one of:
determining that the P-MPR reporting is triggered based on a timer; and
determining that the P-MPR reporting is triggered based on an event.

In an optional implementation mode, the event includes at least one of:
a power reduction value being greater than or equal to a first threshold; and
a power variation being greater than or equal to a second threshold.

Those skilled in the art should understand that the relevant description for the apparatus for reporting the power reduction information in accordance with an implementation of the present disclosure may be understood with reference to the relevant description for the method for reporting the power reduction information in accordance with an implementation of the present disclosure.

Figure 8:
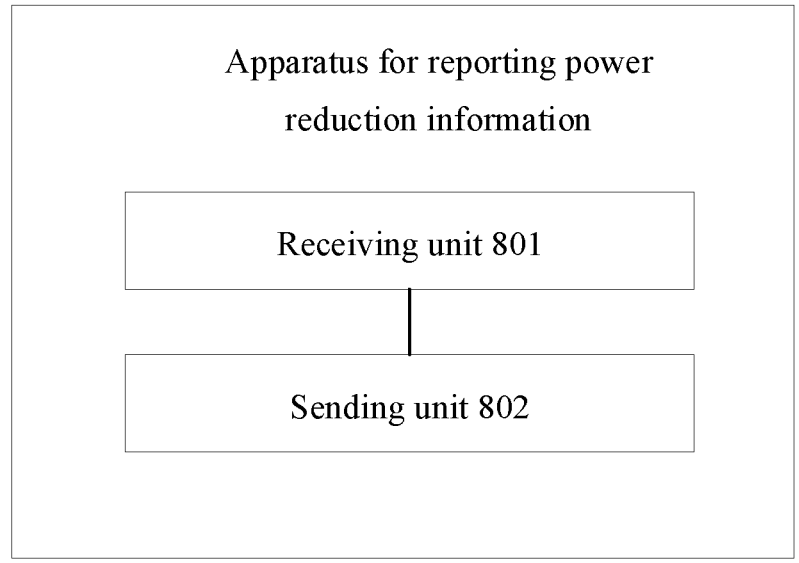
FIG. 8 is a second structure composition schematic diagram of an apparatus for reporting power reduction information in accordance with an implementation of the present disclosure.

FIG. 8 is a second structure composition schematic diagram of an apparatus for reporting power reduction information in accordance with an implementation of the present disclosure, which is applied to a network device and includes a receiving unit 801.

The receiving unit 801 is configured to receive a first MAC CE sent by a terminal device, the first MAC CE including at least one piece of P-MPR information.

In an optional implementation mode, the first MAC CE is a PHR MAC CE, and the PHR MAC CE includes power information of one or more carriers, wherein the power information includes:
first information used to indicate whether the P-MPR is applied to the terminal device;
second information used to indicate whether a power headroom report (PHR) is calculated based on actual transmission or a reference format; and
third information which is PHR.

In an optional implementation mode, in a case that the first information indicates that the P-MPR is applied to the terminal device, if the second information indicates that the PHR is calculated based on the actual transmission, the power information further includes fourth information and fifth information, wherein the fourth information is used to indicate the maximum transmit power of the terminal device; and the fifth information is used to indicate a value range of P-MPR reporting.

In an optional implementation mode, the fourth information occupies 6 bits of a first byte, and the fifth information occupies 2 bits of the first byte; or the fourth information occupies 6 bits of the first byte, and the fifth information occupies N1 bits of a second byte, N1 being an integer greater than or equal to 2 and less than or equal to 8.

In an optional implementation mode, in a case that the first information indicates that the P-MPR is applied to the terminal device, if the second information indicates that the PHR is calculated based on the reference format, the power information further includes fifth information, wherein the fifth information is used to indicate the value range of the P-MPR reporting.

In an optional implementation mode, the fifth information occupies N2 bits of the first byte, N2 being an integer greater than or equal to 2 and less than or equal to 8.

In an optional implementation mode, in a case that the first information indicates that the P-MPR is applied to the terminal device, if the second information indicates that the PHR is calculated based on the reference format, the power information further includes fifth information, which includes first sub-information and second sub-information, wherein the first sub-information is used to indicate a first value range of the P-MPR; and the second sub-information is used to indicate a second value range of the P-MPR within the first value range.

In an optional implementation mode, the first sub-information occupies N3 bits of the first byte, and the second sub-information occupies N4 bits of the first byte, both N3 and N4 being integers greater than or equal to 2, and the sum of N3 and N4 being less than or equal to 8.

In an optional implementation mode, the power information further includes one of fourth information and fifth information, wherein the fourth information is used to indicate the maximum transmit power of the terminal device, and the fifth information is used to indicate the value range of the P-MPR reporting.

In an optional implementation mode, the apparatus further includes: a sending unit 802.

The sending unit 802 is configured to send first indication information to the terminal device, the first indication information being used to indicate whether the terminal device reports the fourth information or the fifth information.

In an optional implementation mode, if the first indication information indicates that the terminal device reports the fourth information, the PHR MAC CE includes the fourth information; or if the first indication information indicates that the terminal device reports the fifth information, the PHR MAC CE includes the fifth information.

In an optional implementation mode, the first indication information is used to indicate whether the terminal device reports the fourth information or the fifth information in a case that the second information indicates that the PHR is calculated based on the actual transmission.

In an optional implementation mode, the power information further includes sixth information, which is used to indicate whether the power information carries the fourth information or the fifth information.

In an optional implementation mode, the first MAC CE includes seventh information and fifth information of a carrier, wherein the seventh information is serving cell index; and the fifth information is used to indicate the value range of the P-MPR reporting.

In an optional implementation mode, the first MAC CE includes a first bitmap and at least one piece of fifth information, wherein each bit in the first bitmap corresponds to a carrier, and a value of the bit is used to indicate whether the first MAC CE includes the fifth information of the carrier corresponding to the bit, and the fifth information is used to indicate the value range of the P-MPR reporting.

Those skilled in the art should understand that the relevant description for the apparatus for reporting the power reduction information in accordance with an implementation of the present disclosure may be understood with reference to the relevant description for the method for reporting the power reduction information in accordance with an implementation of the present disclosure.

Figure 9:
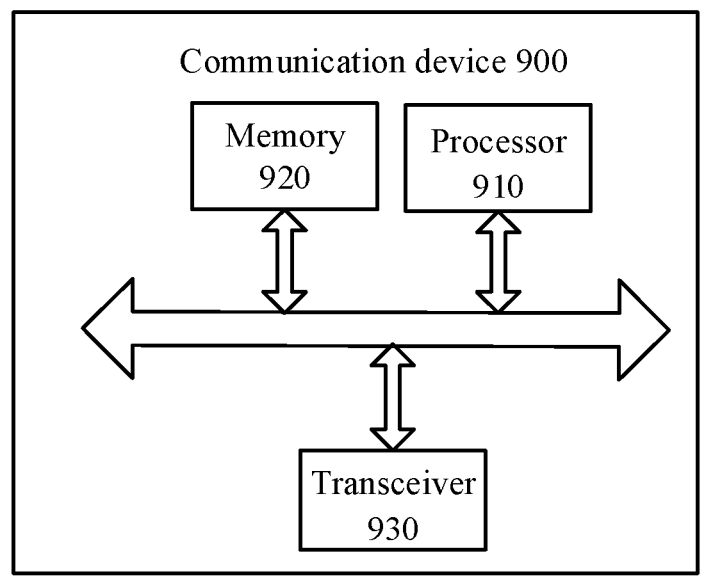
FIG. 9 is a schematic structure diagram of a communication device in accordance with an implementation of the present disclosure.

FIG. 9 is a schematic structure diagram of a communication device 600 in accordance with an implementation of the present disclosure. The communication device may be a terminal device or a network device. The communication device 900 shown in FIG. 9 includes a processor 610, which may invoke and run a computer program from a memory to implement the methods in the implementations of the present disclosure.

Optionally, as shown in FIG. 9, the communication device 900 may further include the memory 920. The processor 920 may invoke and run a computer program from the memory 920 to implement the methods in the implementations of the present disclosure.

The memory 920 may be a separate device independent of the processor 910 or may be integrated in the processor 910.

Optionally, as shown in FIG. 9, the communication device 900 may further include a transceiver 930. The processor 910 may control the transceiver 930 to communicate with other devices. Specifically, the transceiver 930 may send information or data to other devices or receive information or data sent by other devices.

The transceiver 930 may include a transmitter and a receiver. The transceiver 930 may further include antennas, the number of which may be one or more.

Optionally, the communication device 900 may be specifically the network device in accordance with an implementation of the present disclosure, and the communication device 900 may implement the corresponding processes implemented by the network device in various methods in the implementations of the present disclosure, which will not be described repeatedly herein for brevity.

Optionally, the communication device 900 may be specifically the mobile terminal/terminal device in accordance with an implementation of the present disclosure, and the communication device 900 may implement the corresponding processes implemented by the mobile terminal/terminal device in various methods in the implementations of the present disclosure, which will not be described repeatedly herein for brevity.

Figure 10:
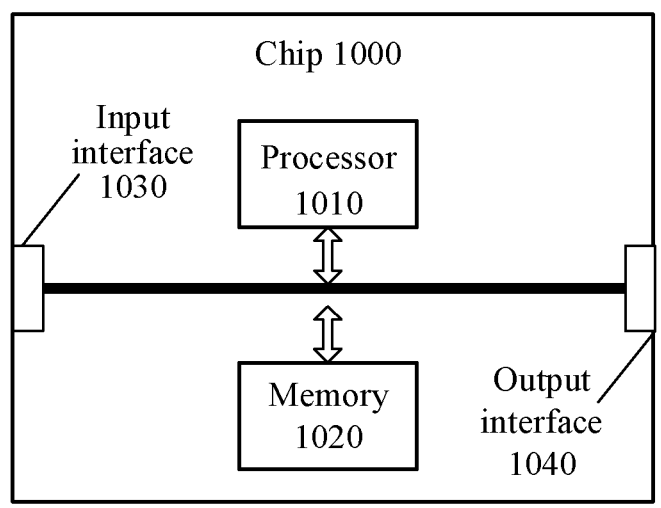
FIG. 10 is a schematic structure diagram of a chip in accordance with an implementation of the present disclosure.

FIG. 10 is a schematic structure diagram of a chip in accordance with an implementation of the present disclosure. The chip 1000 shown in FIG. 10 includes a processor 1010, which may invoke and run a computer program from a memory to implement the methods in the implementations of the present disclosure.

Optionally, as shown in FIG. 10, the chip 1000 may further include the memory 1020. The processor 1010 may invoke and run the computer program from the memory 1020 to implement the methods in the implementations of the present disclosure.

The memory 1020 may be a separate device independent of the processor 1010 or may be integrated in the processor 1010.

Optionally, the chip 1000 may further include an input interface 1030. The processor 1010 may control the input interface 1030 to communicate with other devices or chips. Specifically, the processor 1010 may acquire information or data sent by other devices or chips.

Optionally, the chip 1000 may further include an output interface 1040. The processor 1010 may control the output interface 1040 to communicate with other devices or chips. Specifically, the processor 1010 may output information or data to other devices or chips.

Optionally, the chip may be applied to the network device in the implementations of the present disclosure, and the chip may implement the corresponding processes implemented by the network device in various methods in the implementations of the present disclosure, which will not be described repeatedly herein for brevity.

Optionally, the chip may be applied to the mobile terminal/terminal device in the implementations of the present disclosure, and the chip may implement the corresponding processes implemented by the mobile terminal/terminal device in various methods in the implementations of the present disclosure, which will not be described repeatedly herein for brevity.

It should be understood that the chip mentioned in the implementations of the present disclosure may be referred to as a system-level chip, a system chip, a chip system or a system-on-chip, etc.

Figure 11:
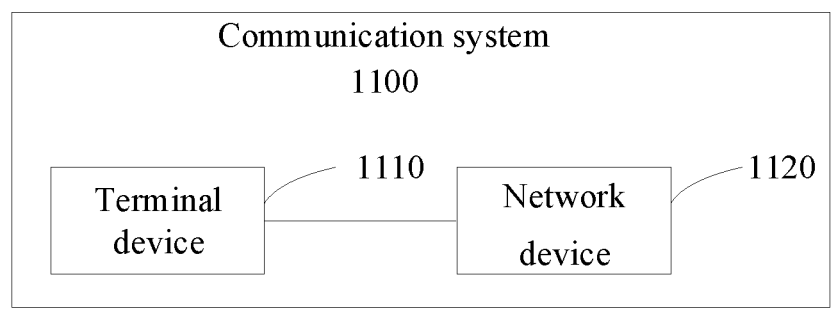
FIG. 11 is a schematic block diagram of a communication system in accordance with an implementation of the present disclosure.

FIG. 11 is a schematic block diagram of a communication system 900 in accordance with an implementation of the present disclosure. As shown in FIG. 11, the communication system 1100 may include a terminal device 1110 and a network device 1120.

The terminal device 1110 may implement the corresponding functions implemented by the terminal device in the above-mentioned methods, and the network device 1120 may implement the corresponding functions implemented by the network device in the above-mentioned methods, which will not be described repeatedly herein for brevity.

It should be understood that the processor in the implementations of the present disclosure may be an integrated circuit chip having a signal processing capability. In an implementation process, each of the steps of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in the implementations of the present disclosure may be directly embodied to be implemented by a hardware decoding processor, or may be implemented by a combination of hardware and software modules in the decoding processor. The software modules may be located in a typical storage medium in the art, such as a random access memory, a flash memory, a read-only memory, a programmable read-only memory, an electrically erasable programmable memory, a register. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through illustrative but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a Synchlink dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an illustrative but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), etc. That is, the memory in the implementations of the present disclosure is intended to include, but not be limited to, these and any other suitable types of memories.

An implementation of the present disclosure further provides a computer readable storage medium configured to store a computer program.

Optionally, the computer readable storage medium may be applied to the network device in the implementations of the present disclosure, and the computer program causes the computer to perform the corresponding processes implemented by the network device in various methods in accordance with the implementations of the present disclosure, which will not be described repeatedly for brevity.

Optionally, the computer readable storage medium may be applied to the mobile terminal/terminal device in the implementations of the present disclosure, and the computer program causes the computer to perform the corresponding processes implemented by the mobile terminal/terminal device in various methods in accordance with the implementations of the present disclosure, which will not be described repeatedly for brevity.

An implementation of the present disclosure further provides a computer program product including computer program instructions.

Optionally, the computer program product may be applied to the network device in the implementations of the present disclosure, and the computer program instructions cause the computer to perform the corresponding processes implemented by the network device in various methods in accordance with the implementations of the present disclosure, which will not be described repeatedly for brevity.

Optionally, the computer program product may be applied to the mobile terminal/terminal device in the implementations of the present disclosure, and the computer program instructions cause the computer to perform the corresponding processes implemented by the mobile terminal/terminal device in various methods in accordance with the implementations of the present disclosure, which will not be described repeatedly for brevity.

An implementation of the present disclosure further provides a computer program.

Optionally, the computer program may be applied to the network device in the implementations of the present disclosure. The computer program, when running on a computer, causes the computer to perform the corresponding processes implemented by the network device in various methods in accordance with the implementations of the present disclosure, which will not be described repeatedly for brevity.

Optionally, the computer program may be applied to the mobile terminal/terminal device in the implementations of the present disclosure. The computer program, when running on a computer, causes the computer to perform the corresponding processes implemented by the mobile terminal/terminal device in various methods in accordance with the implementations of the present disclosure, which will not be described repeatedly for brevity.

A person of ordinary skill in the art may recognize that the elements and algorithm acts in various examples described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for the sake of convenience and conciseness of description, the specific working processes of the systems, apparatuses and units described above may be described with reference to the corresponding processes in the above method implementations and will not be repeated herein.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation.

For example, multiple units or components may be combined or integrated into another system, or some features may be ignored or not executed. In addition, the shown or discussed coupling or direct coupling or communication connection between each other may be an indirect coupling or communication connection through some interfaces, apparatuses or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What we claim is:

1. A method for reporting power reduction information, comprising:
   sending, by a terminal device, a first media access control control element (MAC CE) to a network device, wherein the first MAC CE comprises power management-maximum power reduction (P-MPR) information of at least one carrier,
   wherein the first MAC CE comprises power information of one or more carriers,
   wherein if the power information indicates that a power headroom report (PHR) is calculated based on actual transmission, the power information further comprises information for indicating a maximum transmit power of the terminal device and information for indicating a value range of P-MPR reporting.

2. The method of claim 1, wherein the first MAC CE is a (PHR) MAC CE, and the PHR MAC CE comprises the power information of the one or more carriers, wherein the power information comprises:
   first information, used for indicating whether the P-MPR is applied to the terminal device;
   second information, used for indicating whether the PHR is calculated based on the actual transmission or a reference format; and
   third information, which is the PHR.

3. The method of claim 2, wherein
   the information for indicating the maximum transmit power of the terminal device is fourth information; and
   the information for indicating the value range of P-MPR reporting is fifth information.

4. The method of claim 3, wherein
   the fourth information occupies 6 bits of a first byte, and the fifth information occupies 2 bits of the first byte; or
   the fourth information occupies 6 bits of the first byte, and the fifth information occupies N1 bits of a second byte, N1 being an integer greater than or equal to 2 and less than or equal to 8.

5. The method of claim 1, wherein sending, by the terminal device, the first MAC CE to the network device comprises:
   sending, by the terminal device, the first MAC CE to the network device when PHR reporting and/or P-MPR reporting is triggered.

6. The method of claim 5, wherein the P-MPR reporting being triggered comprises at least one of:
   determining that the P-MPR reporting is triggered based on a timer; and
   determining that the P-MPR reporting is triggered based on an event.

7. The method of claim 6, wherein the event comprises at least one of:
   a power reduction value being greater than or equal to a first threshold; and
   a power variation being greater than or equal to a second threshold.

8. A method for reporting power reduction information, comprising:
   receiving, by a network device, a first access control control element (MAC CE) sent by a terminal device, wherein the first MAC CE comprises at least one piece of power management- maximum power reduction (P-MPR) information,.
   wherein first MAC CE comprises power information of one or more carriers,
   wherein if the power information indicates that a power headroom report (PHR) is calculated based on actual transmission, the power information further comprises information for indicating a maximum transmit power of the terminal device and information for indicating a value range of P-MPR reporting.

9. The method of claim 8, wherein the first MAC CE is a (PHR) MAC CE, and the PHR MAC CE comprises the power information of the one or more carriers, wherein the power information comprises:
   first information, used for indicating whether the P-MPR is applied to the terminal device;
   second information, used for indicating whether the PHR is calculated based on the actual transmission or a reference format; and
   third information, which is the PHR.

10. The method of claim 9, wherein
    the information for indicating the maximum transmit power of the terminal device is fourth information; and
    the information for indicating the value range of P-MPR reporting is fifth information.

11. The method of claim 10, wherein
    the fourth information occupies 6 bits of a first byte, and the fifth information occupies 2 bits of the first byte; or the fourth information occupies 6 bits of the first byte, and the fifth information occupies N1 bits of a second byte, N1 being an integer greater than or equal to 2 and less than or equal to 8.

12. An apparatus for reporting power reduction information, applied to a terminal device, comprising: a processor and a transceiver, wherein the processor is configured to control the transceiver to send a first media access control control element (MAC CE) to a network device, wherein the first MAC CE comprises power management-maximum power (P-MPR) information of at least one carrier, wherein the first MAC CE comprises power information of one or more carriers, wherein if the power information indicates that a power headroom report (PHR) is calculated based on actual transmission, the power information further comprises information for indicating a maximum transmit power of the terminal device and information for indicating a value range of P-MPR reporting.

13. The apparatus of claim 12, wherein the first MAC CE is a (PHR) MAC CE, and the PHR MAC CE comprises the power information of the one or more carriers, wherein the power information comprises:

first information, used for indicating whether the P-MPR is applied to the terminal device;

second information, used for indicating whether the PHR is calculated based on the actual transmission or a reference format; and third information, which is the PHR.

14. The apparatus of claim 13, wherein the information indicating the maximum transmit power of the terminal device is fourth information; and the information for indicating the value range of P-MPR reporting is fifth information.

15. The apparatus of claim 14, wherein the fourth information occupies 6 bits of a first byte, and the fifth information occupies 2 bits of the first byte; or the fourth information occupies 6 bits of the first byte, and the fifth information occupies N1 bits of a second byte, N1 being an integer greater than or equal to 2 and less than or equal to 8.

16. The apparatus of claim 12, wherein the processor is configured to control the transceiver to send the first MAC CE to the network device when PHR reporting and/or P-MPR reporting is triggered.

17. The apparatus of claim 16, wherein the P-MPR reporting being triggered comprises at least one of:

determining that the P-MPR reporting is triggered based on a timer; and determining that the P-MPR reporting is triggered based on an event.

18. The apparatus of claim 17, wherein the event comprise at least one of:

a power reduction value being greater than or equal to a first threshold; and a power variation being greater than or equal to a second threshold.

19. An apparatus for reporting power reduction information, applied to a network device, comprising: a processor and a transceiver, wherein the processor is configured to control the transceiver to receive a first access control control element (MAC CE) sent by a terminal device, wherein the first MAC CE comprises at least one piece of power management-maximum power reduction (P-MPR) information, wherein the first MAC CE comprises power information of one or more carriers, wherein if the power information indicates that a power headroom report (PHR) is calculated based on actual transmission, the power information further comprises information for indicating a maximum transmit power of the terminal device and information for indicating a value range of P-MPR reporting.

20. The apparatus of claim 19, wherein the first MAC CE is a (PHR) MAC CE, and the PHR MAC CE comprises the power information of the one or more carriers, wherein the power information comprises:

first information, used for indicating whether the P-MPR is applied to the terminal device;

second information, used for indicating whether the PHR is calculated based on the actual transmission or a reference format; and third information, which is the PHR.

21. The apparatus of claim 20, wherein the information for indicating the maximum transmit power of the terminal device is fourth information; and the information for indicating the value range of P-MPR reporting is fifth information.

22. The apparatus of claim 21, wherein the fourth information occupies 6 bits of a first byte, and the fifth information occupies 2 bits of the first byte; or the fourth information occupies 6 bits of the first byte, and the fifth information occupies N1 bits of a second byte, N1 being an integer greater than or equal to 2 and less than or equal to 8.

* * * * *